(12) United States Patent
Corder et al.

(10) Patent No.: US 7,958,780 B2
(45) Date of Patent: Jun. 14, 2011

(54) WIND TUNNEL TESTING TECHNIQUE

(75) Inventors: David A. Corder, Tucson, AZ (US); Kevin W. Elsberry, Tucson, AZ (US)

(73) Assignee: Raytheon Company, Waltham, MA (US)

(*) Notice: Subject to any disclaimer, the term of this patent is extended or adjusted under 35 U.S.C. 154(b) by 42 days.

(21) Appl. No.: 12/630,218

(22) Filed: Dec. 3, 2009

(65) Prior Publication Data

US 2010/0132446 A1 Jun. 3, 2010

Related U.S. Application Data

(60) Provisional application No. 61/119,423, filed on Dec. 3, 2008.

(51) Int. Cl.
*G01M 9/00* (2006.01)
*G06G 7/48* (2006.01)
(52) U.S. Cl. .......................................... 73/147
(58) Field of Classification Search .................. None
See application file for complete search history.

(56) References Cited

U.S. PATENT DOCUMENTS

| | | | | |
|---|---|---|---|---|
| 2,661,169 A | * | 12/1953 | Ashkenas | 244/223 |
| 2,785,569 A | * | 3/1957 | Miller | 73/147 |
| 3,043,136 A | * | 7/1962 | Cunningham et al. | 73/862.08 |
| 3,276,251 A | * | 10/1966 | Reed, III | 73/147 |
| 4,682,494 A | * | 7/1987 | Reed | 73/147 |
| 4,920,791 A | * | 5/1990 | Griffin | 73/147 |
| 5,113,696 A | * | 5/1992 | Mole | 73/147 |

* cited by examiner

*Primary Examiner* — Andre J Allen
(74) *Attorney, Agent, or Firm* — Renner, Otto, Boisselle & Sklar, LLP

(57) ABSTRACT

A wind tunnel testing technique or method involves using feedback to position control surfaces of a model so that there is substantially no moment on the model for its given orientation to the airstream. The model is mounted on a sting that allows change in orientation of the model relative to the airstream. A balance is used to provide data regarding the forces and/or moments on the model. This data on forces and/or moments is used in one or more feedback loops to position the control surfaces of the model so that there are substantially no moments on the model. This may be done automatically, with a controller automatically controlling the position of the control surfaces to zero out the moments on the model. The use of the method may allow faster determination of model characteristics, such as determination of the trim envelope of the model.

17 Claims, 5 Drawing Sheets

WIND TUNNEL TESTING TECHNIQUE

This application claims priority under 35 USC 119 from U.S. Provisional Application No. 61/119,423, filed Dec. 3, 2008, which is incorporated by reference in its entirety.

GOVERNMENT RIGHTS

This invention was made with United States Government support under Contract W15QKN-08-C-0054 with the Department of the Army. The United States Government has certain rights in this invention.

BACKGROUND OF THE INVENTION

1. Field of the Invention

The invention is in the field of wind tunnel testing.

2. Description of the Related Art

In wind tunnel testing of aircraft, such as missiles, prior test procedures have involve testing of a large range of control surface positions, Mach numbers, and orientations. This produces voluminous data, which it is time consuming to obtain and process. Improvements would be desirable.

SUMMARY OF THE INVENTION

According to an aspect of the invention, testing in a wind tunnel includes using a remotely controlled model in the wind tunnel, wherein the model can be commanded to automatically trim the pitch, yaw, and roll moments by deflecting the control surfaces as the model attitude is changed.

According to another aspect of the invention, a remotely controlled model for use in a wind tunnel has digital feedback for control surface positions.

According to yet another aspect of the invention, remote control model capability may be utilized in wind tunnel testing.

According to still another aspect of the invention, wind tunnel testing includes use of a remote control model that is an automatically trimmed in all three axes.

According to a further aspect of the invention, wind tunnel testing includes measuring control surface deflections of a remotely controlled model in the wind tunnel.

According to a still further aspect of the invention, a method of wind tunnel testing includes the steps of: coupling an aircraft model to a sting of a wind tunnel; and using at least one of forces and moments measured at the sting, in a feedback loop to adjust position of control surfaces of the model to achieve a predetermined moment on the model.

According to another aspect of the invention, a method of wind tunnel testing includes the steps of: coupling an aircraft model to a sting of a wind tunnel; and determining a flight envelope for the model, wherein the determining includes, for multiple test configuration conditions: setting the test configuration condition in the wind tunnel; and positioning control surfaces of the model, if possible, to obtain a trim condition for model at the test configuration condition, wherein the positioning includes using at least one of forces and moments measured at the sting, in a feedback loop to adjust position of the control surfaces of the model to achieve, if possible, the trim condition.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

The annexed drawings, which are not necessarily to scale, show various aspects of the invention.

DETAILED DESCRIPTION

Figure 1:
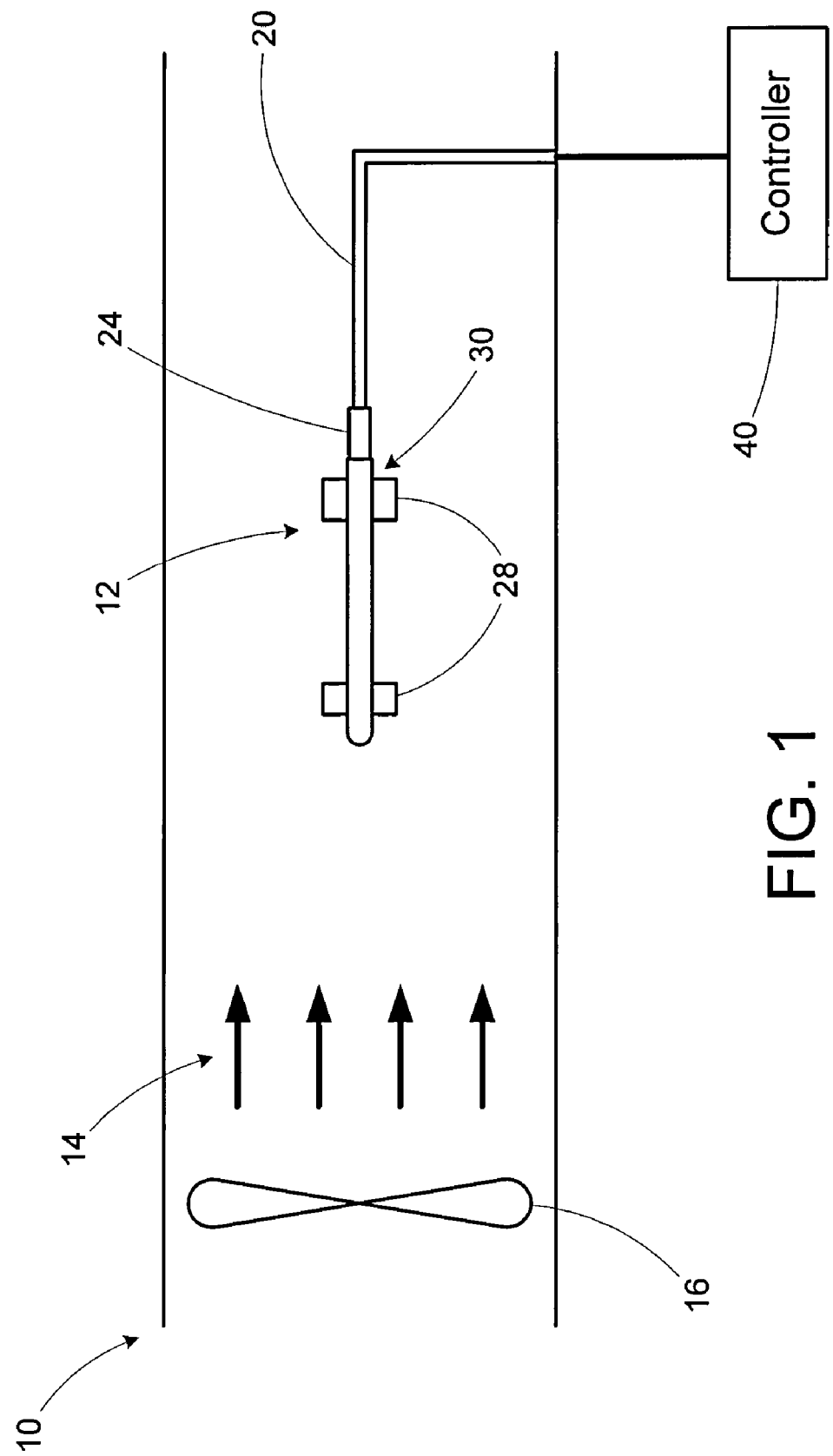
FIG. 1 is a schematic side view of a wind tunnel using in employing a method according to an embodiment of the present invention.

A wind tunnel testing technique or method involves using feedback to position control surfaces of a model so that there is substantially no moment on the model for its given orientation to the airstream. More broadly, the desired condition may involve trimming the model to reach some predetermined combination of moments and/or forces. The model is mounted on a sting that allows change in orientation of the model relative to the airstream. A balance, which may be within or external to the sting, is used to provide data regarding the forces and/or moments on the model. This data on forces and/or moments is used in one or more feedback loops to position the control surfaces of the model so that there are substantially no moments on the model. This may be done automatically, with a controller automatically controlling the position of the control surfaces to zero out the moments on the model. The method may involve taking a number of readings at different angles of attack, Mach numbers, and roll angles. The use of the method may allow faster determination of model characteristics, such as determination of the trim envelope of the model. This may be done without significant further processing of results (such as by computer modeling of the results). This leads to a faster determination of flight characteristics.

A wind tunnel testing technique has been developed and implemented to perform high fidelity three-axis trim of a missile in a wind tunnel. This technique reduces the amount of time to trim an aerodynamic model from 6-8 weeks down to 1-2 hours. This was accomplished by using wind tunnel measurements in real time to move the control surfaces and zero out the moments acting on an airframe. In addition, the technique has the advantage that the fidelity of the data does not have the superposition errors inherent in aerodynamic models.

By actively trimming the missile in the tunnel, the errors inherent with control superposition are eliminated. In addition this process reduces the time from weeks to hours to evaluate an airframe's static trim aerodynamics. This process is ideal for determining many different airframe configurations in minimal time.

Testing in a wind tunnel includes using a remotely controlled model in the wind tunnel that can be commanded to automatically trim the pitch, yaw, and roll moments by deflecting the control surfaces as the model attitude is changed. The remotely controlled model for use in a wind tunnel may have digital feedback for control surface positions. This eliminates lag in the feedback control system, and eliminates possible interference from the drive system on the feedback signal. The primary control system for the remotes surfaces uses traditional proportional-integral-derivative (PID) control system.

A second, outer-loop PID uses balance moment data as input for a trim control system. The outer-loop PID provides new position commands to the primary control system to drive the three moments to requested setpoint values. Among the options for trim control system are: 1) set individual panel deflections; 2) set pitch, yaw, and aileron (PYA) deflection in the body axis; and 3) set elevator, rudder, and aileron (ERA) deflection in the missile axis (non-rolling) system.

A hub-and-spoke approach may be used for acquiring trim data. Trim data may be acquired for roll polars (hubs) with an increasing angle of attack, up to a limit. The roll polars may be acquired in alternating directions. Then pitch polars (spokes) may be acquired at discrete roll angles until a limit is reached.

FIG. 1 shows a wind tunnel 10 for testing an aircraft model 12, such as a missile, by placing the model 12 in an airstream 14. A variable-speed fan 16 may be used for controlling the airspeed (related to Mach number) in the airstream 14. The model 12 is mounted on an adjustable sting 20. The sting 20 is adjustable so as to vary position of the model 12 relative to the airstream 14. In particular, the sting 20 may be adjusted in order to vertically tilt the model 12, to provide an angle of attack of the model 12. The sting 20 may also be able to horizontally tilt the model 12 and/or change the roll angle of the model 12.

The sting 20 includes a balance 24 that detects forces and/or moments on the model 12. The balance 24 may be internal (within the sting 20) or external (outside of the sting 20). The balance 24 may take any of a variety of known configurations for measuring forces and/or moments.

The model 12 may have movable (configurable) control surfaces 28, such as canards or fins. The control surfaces 28 may be adjusted to change the forces and/or moments on the model 12 for a given test configuration condition, such as a given combination of angle of attack, roll angle, and velocity of the airstream 14 (which corresponds to a Mach number). Thus the forces and/or moments measured by the balance 24 may be a function of one or more of Mach number, angle of attack, roll angle, and position of the control surfaces 28. The position of the control surfaces 28 may be controlled by a trim control system 30, for example involving motors or actuators for moving the control surfaces 28. Suitable sensors are used to detect the position of the control surfaces 28. The sensors can be radial encoders, such as rheostats or optical radial encoders.

In addition the wind tunnel 10 may be used to test different models. The results of such tests provide comparisons of the performance of different models. For instance different models may have different fin shapes or configurations. The model 12 may therefore represent possible different configurations, either in the form of entirely separate models, or in the form of different ways of configuring the same model, such as with different fin attachments coupled to a common body, for instance.

A controller 40 is used to control various movable parts of the wind tunnel 10. The controller 40 may be operatively coupled to the fan 16 to control the speed of the airstream 14. The controller 40 also may be operatively coupled to the sting 20 to control the angle of the model 12 (angle of attack and/or roll angle) relative to the airstream 14. Further, the controller 40 may be used to control the control surfaces 28 on the model 12. The controller 40 may control all or any combination of the above parameters automatically, adjusting the parameters without input from an operator.

In particular, the controller 40 may be used to automatically position the control surfaces 28 to (if possible) to achieve a trim condition of the model 12 where the model 12 has substantially a predetermined force and/or predetermined moments on it for a given orientation (relative to the airstream 14) and Mach number (proportional to the velocity of the airstream 14). The predetermined force and/or predetermined moments may be substantially zero force and/or moment. This represents a condition of steady flight at the given orientation and Mach number. Alternatively, the predetermined force and/or moment may be a predetermined collection of moments, for example representing a maneuver performed by the aircraft corresponding to the model 12. The data measured by the balance 24 may be used by the controller 40 to position the control surfaces 28 to achieve the trim condition (if possible).

Figure 2:
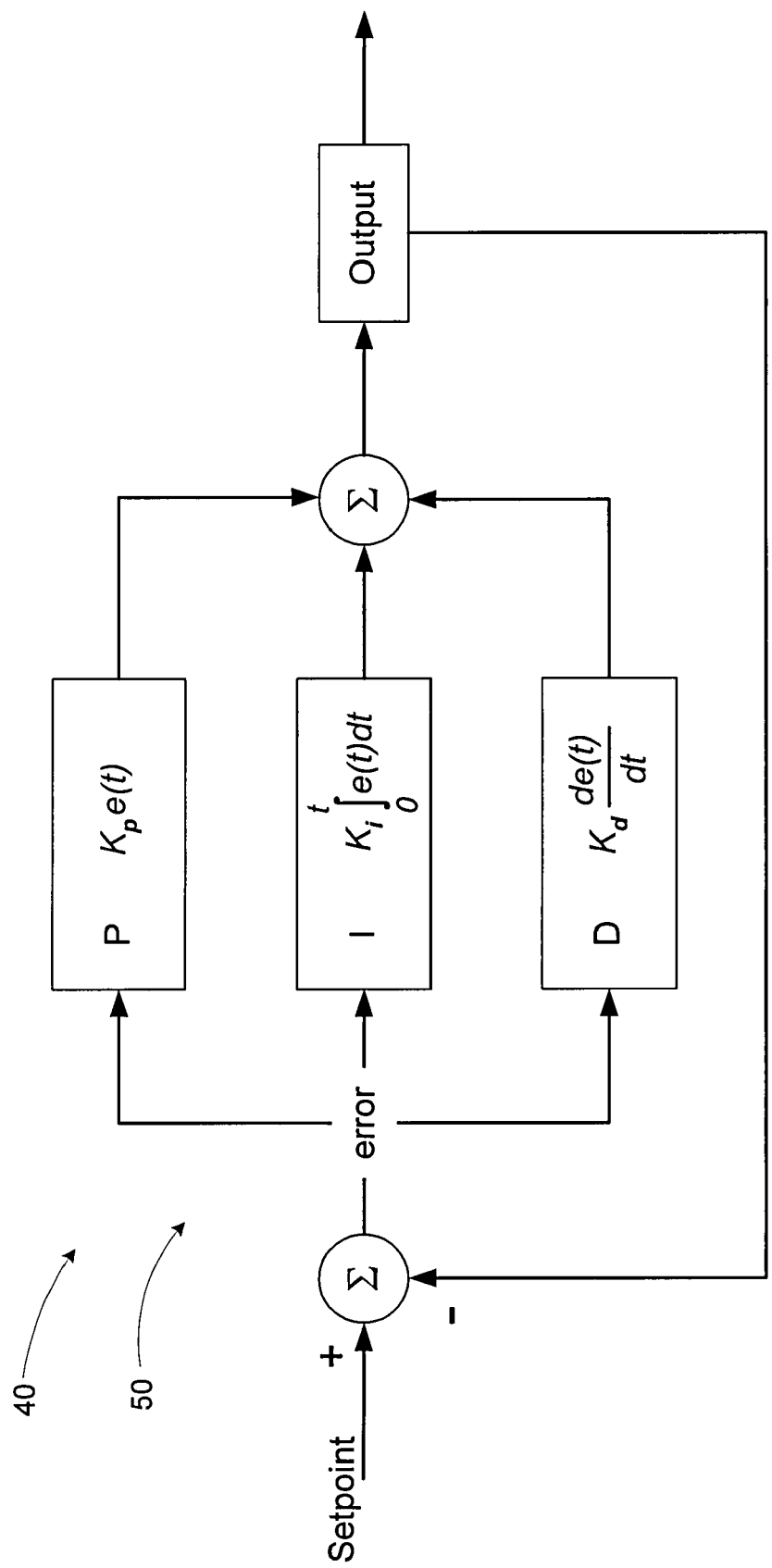
FIG. 2 is a block diagram of part of a controller used in a method according to an embodiment of the present invention.

With reference now in addition to FIG. 2, the controller 40 may employ feedback loops to bring the model 12 (FIG. 1) into trim. There may be a hierarchy of feedback loops, with a series of proportional-integral-derivative (PID) inner feedback loops, such as the loop 50 shown in FIG. 2, used to move the control surfaces 28 (FIG. 1) to desired set points. The loop 50 uses digital feedback from the control surfaces 28 to detect errors in the control surface position from a desired position (setpoint) for the control surfaces 28. Output signals are sent to the control surfaces 28 to cause deflections of the control surfaces 28 to reach the desired setpoints. PID control loops configured similar to the loop 50 are used to position individual of the control surfaces 28. Control loops such as the loop 50 take input from the position of a corresponding control surface, and use that information in a digital feedback loop to reach a desired setpoint or other indicator of a desired position. This reduces lag in the feedback system and also eliminates possible interference from the drive system on the feedback system.

Figure 3:
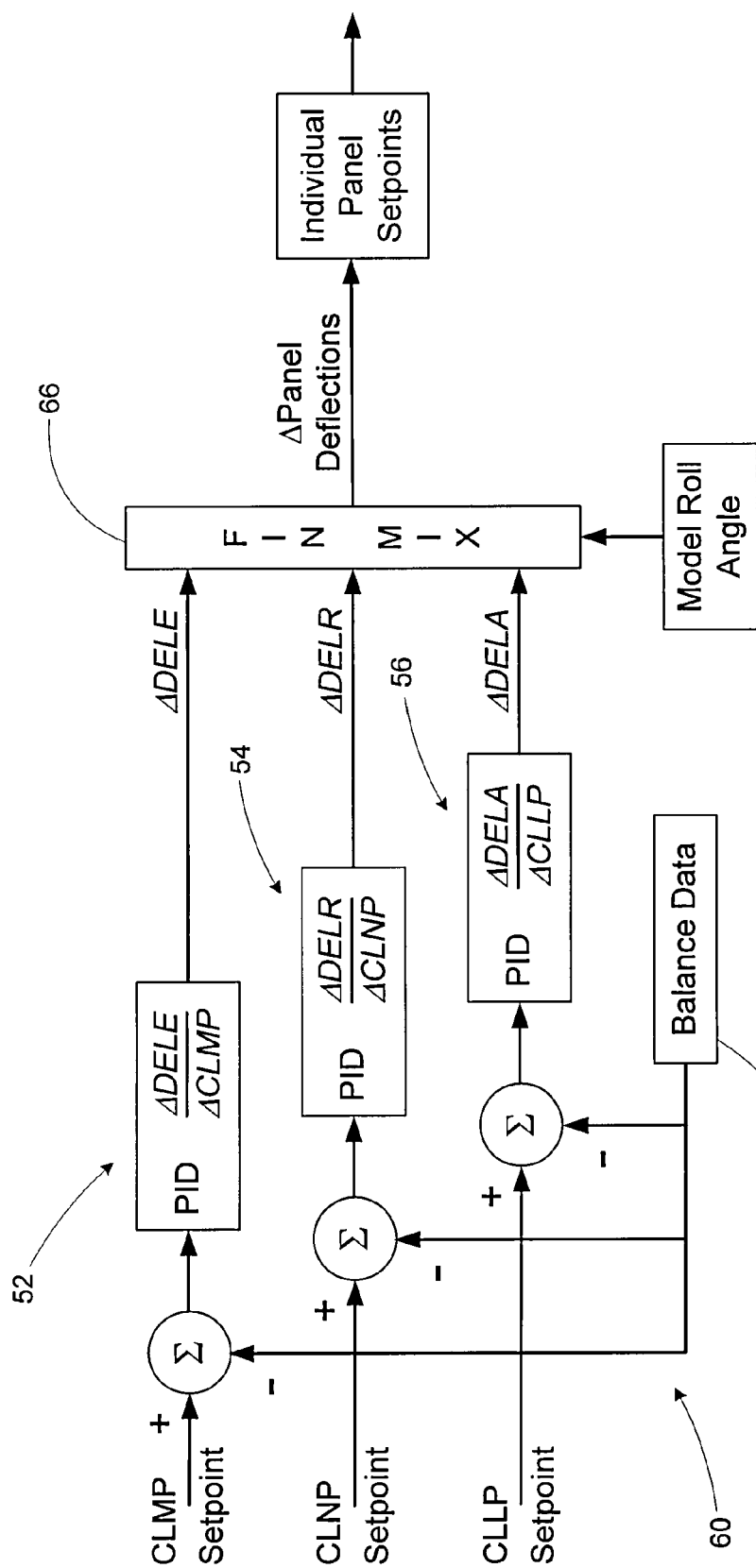
FIG. 3 is a block diagram showing other parts of the controller.

Turning now to FIG. 3, PID control loops 52, 54, and 56 are used to position different control surfaces 28 (FIG. 1) of the model 12 (FIG. 1). The control loops 52, 54, and 56 are used to position an elevator, a rudder, and an aileron, respectively. The PID control loops 52-56 are used to move the rudder to a desired aileron deflection angle, to move the rudder to a desired rudder deflection angle, and to move the elevator to a desired elevator deflection angle. It will be appreciated that these are only examples of possible types of control surfaces and setpoints for them. Other configurations of control surfaces may have other types of setpoints, that can be obtained by using PID controllers like the PID controller 50 shown in FIG. 2.

The controller 40 also includes an outer feedback loop 60 that is used to adjust the setpoints that are input into the PID control loops 52, 54, and 56. Balance data 64 from the balance 24 is used to aid in adjusting the setpoints to achieve a fin mix 66 that achieves the predetermined force and/or moments on the model 12. As noted above, the predetermined force and/or moments may be substantially zero, or may be some other desired predetermined value.

The second, outer-loop PID 60 uses the balance moment data 64 as input for the trim control system 30 (FIG. 1). The outer-loop PID 60 provides new position commands to the primary control system to drive the three moments to their desired setpoint values. It will be appreciated that several options are possible for the trim control system: 1) set the individual panel (control surface) deflections, 2) set pitch, yaw, and aileron (PYA) deflection in the body axis, 3) set elevator, rudder, and aileron (ERA) deflection in the missile axis (non-rolling) system. The PYA and ERA deflections are combinations of the individual panel deflections with the fin mix for ERA being a function of roll angle. Theoretically all approaches would provide the same settings. However the missile axis solution has the advantage that three primary sensitivity terms (elevator, rudder, and aileron angles) could be used in the trim control system and may not be sensitive to roll angle. While the same may be true of the body axis system, the rate of change for pitch and yaw deflection would be much greater than for elevator and rudder as the model is rolled because the loads transfer from one plane to the other. Using the individual panels for control would result in a matrix of sensitivity terms with interactions that would make tuning the system more difficult than changing three independent values. All three PID channels would be simultaneously processed to provide incremental change to the individual control surface setpoints and sent to the primary control system at a 20 Hz update rate. The setpoints could be zero for trim or set to any value to maintain a constant maneuver in any of three axes.

The trim control system 30 (FIG. 1) may be tuned to account for aerodynamic response characteristics. A step change in the model attitude may be applied to test an initial guess for the proportional constants. The proportional gains may be adjusted until oscillation occurs, and then may be reduced.

The controller 40 may be embodied in any of a variety forms. For example the various functions of the controller 40 may be embodied in hardware and/or software.

Data may be taken in a move-pause approach or sequence, with data taken for one set of test conditions before moving on to the next set of conditions. The sets of test conditions may be as described above, for example including a Mach number, angle of attack, and roll angle. The model may be trimmed automatically using the feedback system of the controller, to orient the control surfaces so as to achieve desired trim conditions, such as substantially zero moments on the model. Then one or more parameters may be varied to set up another set of conditions for which data may be taken. The data taken may include the position of the control surfaces to achieve the desired trim, or even that the desired trim is achievable or not achievable for a given set of conditions.

More particularly, a hub-and-spoke approach may be used for acquiring trim data. Trim data may be acquired for roll polars (hubs) with an increasing angle of attack, up to a limit. The roll polars may be acquired in alternating directions. Then pitch polars (spokes), related to angle of attack, may be acquired at discrete roll angles until a limit is reached.

Figure 4:
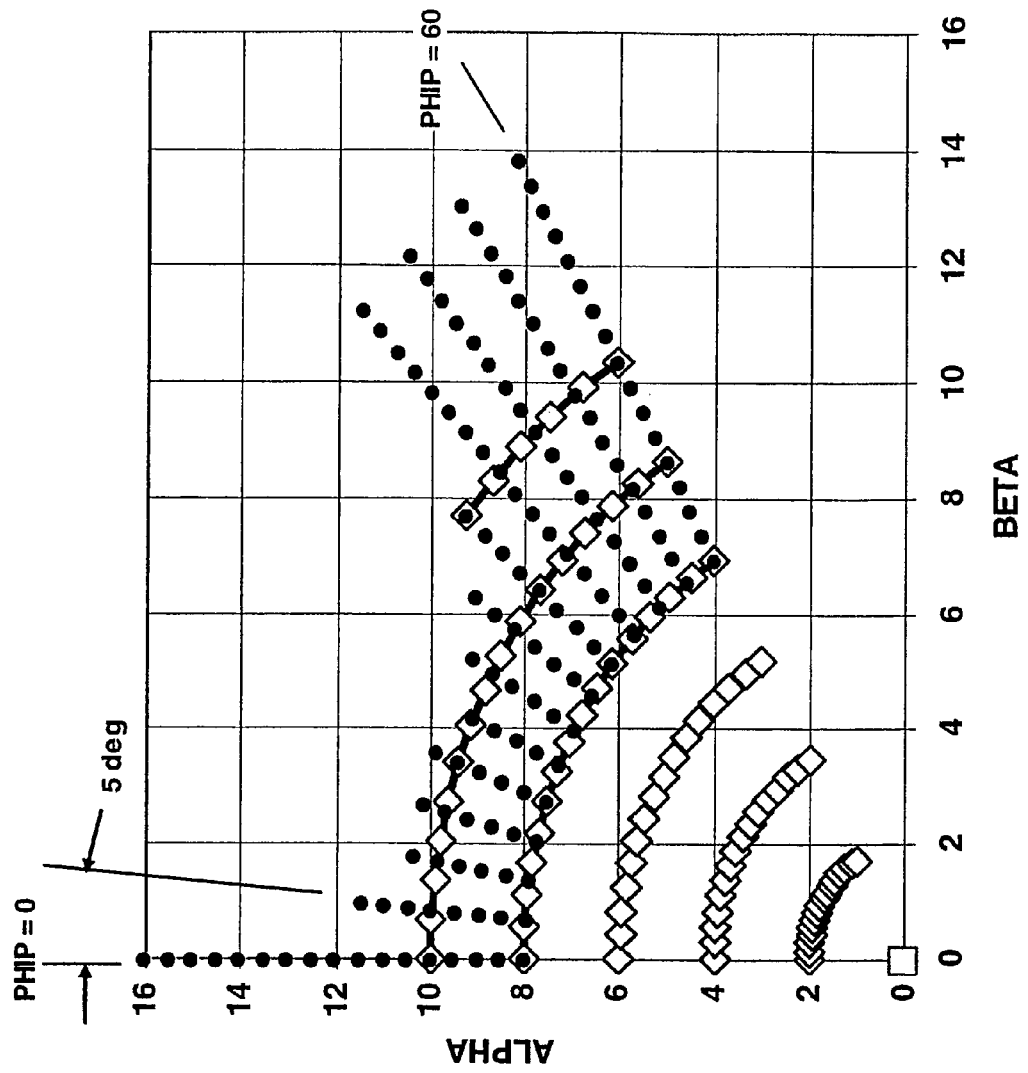
FIG. 4 is a plot showing an example of a flight envelope obtained using an embodiment of the invention.

The hub-and-spoke trim matrix described above may be used identify control limits and flight performance for one or more models 12 (FIG. 1). FIG. 4 shows an example of results from testing, showing a flight envelope determined from testing with a hub-and-spoke matrix. The figure shows a plot of angle of attack (ALPHA) versus sideslip angle (BETA), with increments of 5 degrees for roll angle (PHIP). The open diamonds represent points where trim conditions could be achieved. In performing testing on such a matrix the roll angle may be set to a first value, with tests performed at increasing pitch until the model can no longer be kept in trim.

It will be appreciated that alternatively the data may be acquired in other ways. For example data may be acquired in one or more continuous sweeps, changing conditions without pausing.

Methods such as those described above may be used to evaluate tail surface sets with different chords, spans, and sweep angles, for example. Each candidate tail fin set may be installed as part of a different model, and the hub-and-spoke trim matrix acquired to identify control limits and flight performance. If a configuration is successful in acquiring hub trim data at all angles of attack there is no requirement to run the spoke polars. The trim envelope may be acquired for two or three center of gravity locations to measure sensitivity on trim. After the optimal tail fin configuration is selected, a traditional documentary database may be collected for later use in generating an aerodynamic model of the selected configuration.

The methods described above may be used to quickly and effectively characterize performance and/or make selections among configurations. In prior methods, wind tunnel testing performance could take weeks, as data was gathered across flight performance range. Weeks of testing could be needed to acquire a performance and control database, with manual or remote deflection of control surfaces. After the testing was performed, an aerodynamic model would have to be developed. This would involve producing a computer model that provides a fit to the data collected. After the computer model is created the trim requirements are determined from the computer model. Further wind tunnel testing may then be performed to verify the accuracy of the computer model, and to further evaluate and/or characterize missile performance.

Figure 5:
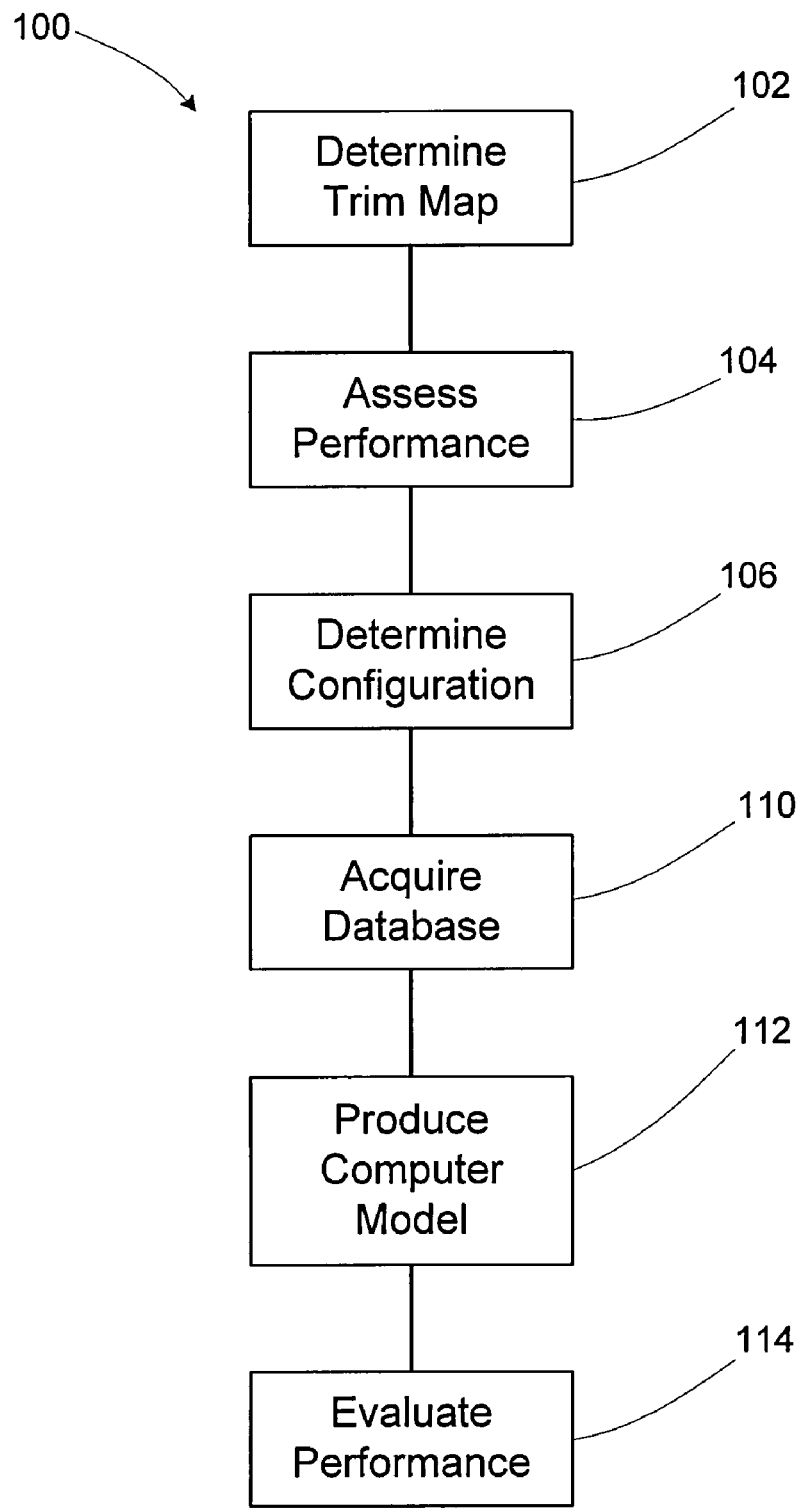
FIG. 5 is a high-level flow chart showing a method in accordance with an embodiment of the invention.

FIG. 5 shows a flow chart of a test and evaluation method 100 that incorporates the wind tunnel testing methods described above. At step 102 a trim map, such as shown in FIG. 4 is determined. The determination of a trim map is meant broadly to encompass the various new methods of wind tunnel testing described above. The determination of a trim map may utilize remote control model control capability to automatically trim the model 12 (FIG. 1), and may include measuring or sensing (and storing) deflections of the control surfaces 28 (FIG. 1). The determining of a trim map need not necessarily resulting in a graph like that shown in FIG. 4, or the equivalent.

In step 104 the trim data is used to assess performance capability. The assessment of performance capability may involve determining whether a given configuration (size, shape, and/or angle of fins, for example) has acceptable performance. Alternatively or in addition, the assessment may involve comparing the performance of different models and/or configurations. The performance compared may involve the flight envelope(s) of the model(s), as well as other parameters.

In step 106 an optimum configuration is determined. The determination of optimum configuration may overlap with the assessment of step 104. For example the determination may involve a comparison of different possible fin configurations, which may be embodied in different models or different model parts (such as different tail sections).

A traditional database then may be acquired in step 110. From the database a computer model may be produced, in step 112, to fit the data acquired in step 110. Using this computer model or further testing, in step 114 missile performance may be evaluated.

The method 100 has advantages over prior methods in that missile (aircraft) performance may be quickly characterized, such as by determining the flight envelope even while testing is going on. This may reduce the time needed to determine the flight envelope, or to otherwise characterize the conditions of the aircraft, from 6-8 weeks down to 1-2 hours.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A method of wind tunnel testing, the method comprising:
    coupling an aircraft model to a sting of a wind tunnel; and
    using at least one of forces and moments measured at the sting, in a feedback loop to adjust position of control surfaces of the model to achieve a predetermined moment on the model.

2. The method of claim 1, wherein the using includes adjusting position of canards of the model.

3. The method of claim 1, wherein the using includes adjusting position of fins of the model.

4. The method of claim 1, wherein the using includes automatically adjusting the position of the control surfaces using a controller that receives information on the position of the control surfaces and the at least one of the forces and movements on the model, from a balance that is operatively coupled to the sting.

5. The method of claim 4, wherein the automatically adjusting includes adjusting desired position of the control surfaces using an additional feedback loop of the controller, using the at least one of the forces and movements as an input to the additional feedback loop.

6. The method of claim 1, wherein the predetermined moment is a substantially zero moment.

7. The method of claim 6, wherein the control surfaces are adjusted to substantially zero moment for a range of conditions.

8. The method of claim 7, wherein the range of conditions includes a range of roll angles and a range of angle of attack.

9. The method of claim 8, wherein the range of conditions further includes a range of Mach number.

10. The method of claim 1, wherein the using includes using a proportional-integral-derivative (PID) control system in the feedback loop.

11. A method of wind tunnel testing, the method comprising:
    coupling an aircraft model to a sting of a wind tunnel; and
    determining a flight envelope for the model, wherein the determining includes, for multiple test configuration conditions:
        setting the test configuration condition in the wind tunnel; and
        positioning control surfaces of the model, if possible, to obtain a trim condition for model at the test configuration condition, wherein the positioning includes using at least one of forces and moments measured at the sting, in a feedback loop to adjust position of the control surfaces of the model to achieve, if possible, the trim condition.

12. The method of claim 11, wherein the using includes automatically adjusting the position of the control surfaces using a controller that receives information on the position of the control surfaces and the at least one of the forces and movements on the model, from a balance that is operatively coupled to the sting.

13. The method of claim 12, wherein the automatically adjusting includes adjusting desired position of the control surfaces using an additional feedback loop of the controller, using the at least one of the forces and movements as an input to the additional feedback loop.

14. The method of claim 11, wherein the determining includes determining the flight envelope for multiple combinations of roll angle and angle of attack as included in the multiple test configuration conditions.

15. The method of claim 14, wherein the determining includes testing the multiple combinations of roll angle and angle of attack by changing the angle of attack while holding roll angle substantially constant, before changing the roll angle.

16. The method of claim 11, further comprising:
    coupling a second aircraft model to the sting, in place of the aircraft model;
    determining a flight envelope for the second aircraft model; and
    comparing the flight envelopes of the aircraft models.

17. The method of claim 11, wherein the positioning includes positioning the control surfaces such that there is substantially no moment on the model.

* * * * *